Patented May 2, 1933

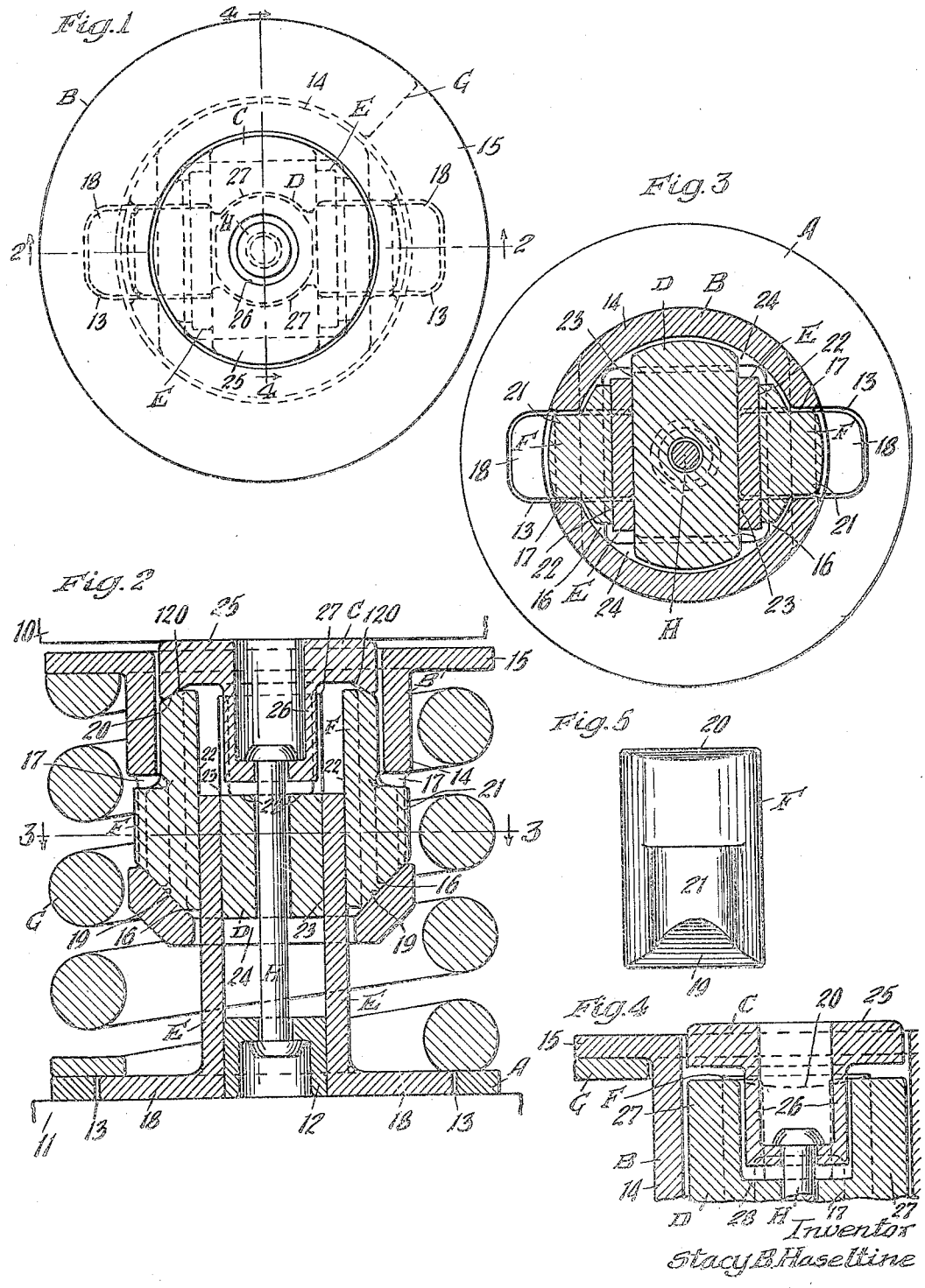

1,907,068

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed October 8, 1931. Serial No. 567,633.

This invention relates to improvements in friction shock absorbing mechanisms.

One object of the invention is to provide a friction shock absorbing mechanism in the form of a unit of high capacity and of simple and efficient design, which may be readily employed as cushioning means wherever relatively heavy shocks are encountered, and which is more particularly designed to be used in place of one or more of the usual springs employed in tandem spring shock absorbing mechanisms, and also in place of one or more of the springs of car trucks.

Another object of the invention is to provide a friction shock absorbing unit of the character specified in the preceding paragraph, having high frictional capacity produced by a plurality of relatively movable friction elements presenting relatively large cooperating friction surface areas.

A more specific object of the invention is to provide a high capacity friction shock absorbing mechanism of compact design, including a central friction block and cooperating friction plates, wherein the block and plates are relatively movable during compression of the mechanism and are forced into tight frictional contact by laterally inwardly acting pressure-creating means including a wedge member and wedge blocks engaged by the wedge member, the blocks being arranged for sliding frictional contact with the friction plates to augment the frictional resistance.

Other objects of the invention will more clearly appear from the description and claims hereinafter following.

In the drawing, forming a part of this specification, Figure 1 is a top plan view of my improved friction unit. Figure 2 is a vertical sectional view, corresponding substantially to the line 2—2 of Figure 1, said view also showing follower means associated with the unit. Figure 3 is a horizontal, transverse sectional ivew, corresponding substantially to the line 3—3 of Figure 2. Figure 4 is a vertical sectional view on the line 4—4 of Figure 1, showing the upper part only of the unit. And Figure 5 is a detailed elevatitonal view of a friction wedge block employed in connection with my improved mechanism.

In said drawing, 10 and 11 indicate two follower-acting members which are relatively movable toward and away from each other, such as the two end followers of a railway draft rigging or the cooperating bolster and spring plank of a railway car truck. My improved friction shock absorbing unit is interposed between the follower-acting members 10 and 11 and is compressed therebetween upon relative movement thereof toward each other.

My improved friction shock absorbing unit comprises broadly a spring follower disc member A; a combined spring follower and wedge sleeve B; a follower disc C; a central friction block D; a pair of friction plates E—E; a pair of friction wedge blocks F—F; a spring resistance G; and a retaining element H.

The spring follower A bears directly on the follower-acting member 11 and is provided with a central, inwardly projecting hollow boss 12 and openings 13—13 at opposite sides of the boss for a purpose hereinafter pointed out.

The combined spring follower and wedge sleeve B comprises a tubular section 14 having an annular spring abutment flange 15 at the outer end thereof. At the inner end, the tubular section 14 is provided with a pair of opposed interior wedge faces 16—16, which cooperate with the two friction wedge blocks F—F as hereinafter pointed out. Immediately adjacent to the wedge faces 16—16, the wall sections of the tubular member are provided with openings 17—17.

The two friction plates E—E have laterally outwardly extending flanges 18—18 at their lower ends, as clearly shown in Figures 2 and 3, said flanges being accommodated in the openings 13—13 of the spring follower A. The flanges 18—18 loosely fit the openings 13—13 so that a certain amount of lateral movement of the plates is permitted. The main portions of the plates E—E are of greater width than the flanges 18—18, thus extending beyond the side walls of the openings 13—13 and bearing at their lower ends on the spring follower A. The plates extend into the tubular sleevelike portion 14 of the member B and embrace the boss 12 of the spring follower A on opposite sides.

The two friction wedge blocks F—F are of similar design, each having a wedge face 19 at the inner end thereof engaging the corresponding wedge face 16 of the member B. At the opposite end, each friction wedge block F is provided with a relatively short wedge face 20, which cooperates with the follower disc C, as hereinafter pointed out. Each friction wedge block F has a lateral projection 21, which is accommodated within the corresponding opening 17 of the wall of the tubular section of the spring follower B. The two friction wedge blocks embrace the friction plates E—E at opposite sides and have longitudinally disposed flat friction surfaces 22—22 on the inner sides which engage the outer sides of the plates.

The central friction block D is disposed between the plates E—E and has friction surfaces 23—23 on opposite sides thereof which cooperate with the inner surfaces of the two plates E—E. The tubular section of the spring follower B is provided with inwardly extending opposed flanges 24—24 at the inner end thereof, on which the friction block D is seated.

The follower disc C has a flat outer end face 25, which bears directly on the follower-acting member 10. On the inner side, the follower disc C has a central projection 26 in the form of a hollow boss, which is embraced by an upwardly extending forklike section 27 of the block D. At the inner end of the forked section of the block D, a flat abutment face 28 is provided, which is normally slightly spaced from the inner end of the projection 26 of the follower disc C. The upper ends of the sections of the forked portion of the block D are flat and are spaced from the inner side of the disc portion proper of the follower C to an extent equal to the spacing between the abutment surface 28 and the inner end of the projection 26 of the follower C. The follower C also has a pair of wedge faces 120—120 on the inner side thereof, which have wedging engagement with the wedge faces 20—20 at the outer ends of the friction wedge blocks F—F.

The spring resistance G is in the form of a relatively heavy coil surrounding the tubular or sleeve-like section of the spring follower B, and has the upper end thereof bearing directly on the flange 15 of the follower B. The lower end of the spring resistance G bears on the spring follower A and on the outer ends of the flanges 18—18 of the plates E—E. As will be evident, the spring G yieldingly opposes relative movement of the friction plates E—E and the combined spring follower and wedge sleeve B.

The mechanism is held assembled and of uniform overall length by the retaining element H, which is in the form of a bar headed at opposite ends, the heads having shouldered engagement with the end walls of the bosses 12 and 26 respectively of the spring followers A and B. The parts are so adjusted that the retaining element H maintains the spring resistance G under a predetermined initial compression.

The parts are so proportioned that they occupy the position shown in Figure 2 in full release of the mechanism. As shown in Figure 2, the follower disc C bears directly on the follower-acting member 10 and projects outwardly of the spring follower B, thereby maintaining the flange 15 of the spring follower B spaced from the follower-acting member 10. In the normal position of the parts, the follower disc is spaced from the outer forked end of the friction block D, and the inner end of the boss 26 is spaced from the abutment surface 28 of said block.

In the operation of my improved shock absorbing unit, upon relative movement of the follower-acting members 10 and 11 toward each other, the follower disc C and the follower A together with the plates E—E will be moved toward each other lengthwise of the mechanism. Inasmuch as movement of the spring follower B with respect to the spring follower A and the plates E—E is yieldingly opposed by the spring resistance G, the friction wedge blocks F—F will be forced against the wedge faces of the sleeve-like section of the follower B through the action of the follower disc C. The friction wedge blocks F—F will thus be wedged laterally inwardly against the friction plates E—E, pressing the latter into tight frictional engagement with the friction block D. Due to the relative longitudinal movement of the follower disc C with respect to the plates E—E and the spring follower A, the friction wedge blocks F—F will be forced to slide on the friction plates E—E. During the first part of the compression stroke of the mechanism there will be no movement of the central friction block D. However, upon the clearance between the follower member C and the friction wedge block D being taken up, the latter will be forced inwardly in unison with the friction wedge blocks F—F. During the continued action of the mechanism, the friction wedge blocks F—F and the friction block D will slide on the friction plates E—E while relative approach of the parts is yieldingly resisted by the spring G. Due to the wedging action between the disc C and the outer ends of the friction wedge blocks F—F, the pressure on the outer sides of the friction plates is equalized. Compression is limited by engagement of the upper ends of the plates E—E by the follower disc C, and engagement of the block D by both the plate C and the boss on the follower A, the overload thus being transmitted through the plates E—E and the block D.

Upon the actuating pressure being reduced, release the mechanism, is effected by expansion of the spring resistance G, which returns the parts to the normal position shown in Figure 2. Release is facilitated by initial movement of the follower disc C away from the block D, this movement being permitted due to the clearance between these two members. Outward movement of the spring follower B with respect to the plates E—E and the spring follower A is limited by engagement of the wedge faces of the spring follower B with the wedge faces at the inner ends of the friction wedge blocks F—F, the wedge blocks having their movement arrested by the follower disc C, movement of which in turn is limited by the retaining element H.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring follower element; of friction plates, said spring follower element and friction plates being movable relatively with respect to each other lengthwise of the mechanism; spring means opposing relative movement of said spring follower element and plates, said spring follower element having interior, inwardly acting wedge faces; a pair of wedge blocks having wedging engagement with the wedge faces of said spring follower and frictional engagement with said plates; a movable friction member between said plates having sliding frictional contact therewith; and pressure-transmitting means engageable with said wedge blocks and friction member for forcing said friction wedge blocks and movable friction member inwardly lengthwise of the mechanism.

2. In a friction shock absorbing mechanism, the combination with a central friction member having exterior friction surfaces disposed lengthwise of the mechanism; of friction plates arranged lengthwise of the mechanism and having frictional engagement with the friction surfaces of said member; a spring follower sleeve into which said plates extend, said spring follower sleeve having interior wedge faces; wedge blocks having wedging engagement with the wedge faces of said sleeve and frictional engagement with said plates; pressure-transmitting means for forcing said wedge blocks and friction member inwardly lengthwise of the mechanism; and spring resistance means bearing on said spring follower sleeve and yieldingly opposing relative longitudinal movement of said spring follower sleeve and friction plates.

3. In a friction shock absorbing mechanism, the combination with a spring follower sleeve having interior wedge faces; of friction plates extending into said sleeve, said sleeve and plates being relatively movable lengthwise of the mechanism; spring resistance means opposing said relative movement of said sleeve and plates; a friction block between said plates and having frictional contact therewith; friction wedge blocks having wedging engagement with the wedge faces of said sleeve and frictional engagement with said plates; and a pressure-transmitting member engaging the outer ends of said friction wedge blocks, said pressure-transmitting member having an abutment face normally spaced from the outer end of said friction block a distance less than the full compression stroke of the mechanism.

4. In a friction shock absorbing mechanism, the combination with a spring follower sleeve having interior wedge faces; of friction plates extending into said sleeve, said sleeve and plates being relatively movable lengthwise of the mechanism; spring resistance means opposing said relative movement of said sleeve and plates; a friction block between said plates and having frictional contact therewith; friction wedge blocks having wedging engagement with the wedge faces of said sleeve and frictional engagement with said plates; and a pressure-transmitting member having the outer end projecting outwardly beyond said spring follower sleeve, and having the inner end normally spaced from said friction block to an extent less than the full compression stroke of the mechanism, said pressure-transmitting member having shouldered engagement with the friction wedge blocks to force the same inwardly lengthwise of the mechanism when said mechanism is compressed.

5. In a friction shock absorbing mechanism, the combination with main follower-acting members movable toward and away from each other; of friction plates extending lengthwise of the mechanism and bearing on one of said main follower-acting members; a pressure-transmitting element bearing on the other follower-acting member; a spring follower sleeve spaced from said last named follower-acting member, said sleeve having interior wedge faces; friction wedge blocks engaged by said pressure-transmitting element and having wedging engagement with the wedge faces of said spring follower sleeve, said friction wedge blocks having sliding frictional contact with said plates; a central friction block between said plates having frictional contact therewith, said central friction block being moved inwardly lengthwise of the mechanism by said pressure-transmitting element upon relative approach of said main follower-acting members; and spring resistance means yieldingly opposing relative movement of said plates and spring follower sleeve.

6. In a friction shock absorbing mechanism, the combination with main follower-acting members movable toward and away from each other; of friction plates disposed lengthwise of the mechanism, said plates having lateral flanges at one set of ends bearing on one of said main follower-acting members; a pressure-transmitting member bearing on the other follower-acting member; a spring follower sleeve having the outer end spaced from said last named follower-acting member, said sleeve having an abutment flange at said outer end and interior wedge faces near the inner end; a spring resistance surrounding said sleeve and having its opposite ends bearing respectively on the flange of said sleeve and the flanges of said plates; friction wedge blocks engaged at their outer ends by said pressure-transmitting member and having wedging engagement at the inner ends with said interior wedge faces of the sleeve, said friction wedge blocks embracing said plates and having sliding frictional contact therewith; and a central friction block between said plates engaged and moved by said pressure-transmitting member after a predetermined initial compression of the mechanism.

7. In a friction shock absorbing unit, the combination with a spring follower having a sleevelike inward extension provided with interior wedge faces; of a second spring follower, said spring followers being movable toward and away from each other, said second named spring follower having an opening therein; friction plates disposed lengthwise of the mechanism, said plates having lateral flanges at one set of ends seated in the opening of said second named spring follower; a spring resistance surrounding said sleevelike extension and bearing at one end on said second named spring follower and the flanges of said plates, and bearing at the other end on said first named spring follower; a central friction block between said plates; friction wedge blocks embracing said plates and having wedging engagement with the wedge faces of said sleevelike extension; and a pressure-transmitting member engaging said friction wedge blocks and projecting outwardly of said first named spring follower, said pressure-transmitting member having the inner end thereof normally spaced from said central friction block.

8. In a friction shock absorbing mechanism, the combination with friction plates; of a friction block disposed between said plates, said block and plates being relatively movable with respect to each other in a direction lengthwise of the mechanism; a spring follower sleeve surrounding said plates, said sleeve having interior wedge faces at the inner end, said sleeve also having shouldered engagement with the inner end of said friction block; a spring yieldingly opposing movement of the friction plates and sleeve with respect to each other in a direction lengthwise of the mechanism; friction wedge blocks having wedging engagement with the wedge faces of said sleeve, said friction wedge blocks embracing the plates and having frictional engagement therewith; and a pressure-transmitting member bearing on the outer ends of said friction wedge blocks and having its outer end projecting beyond the outer end of the sleeve, said pressure-transmitting member engaging the friction block after a predetermined compression of the mechanism.

9. In a friction shock absorbing mechanism, the combination with a central friction block; of friction plates embracing said block and having frictional contact therewith, said plates and block being movable with respect to each other lengthwise of the mechanism; a pressure-transmitting member for moving said block; friction wedge blocks embracing said plates and having frictional engagement therewith, said friction wedge blocks having wedge faces at the outer and inner ends, and said pressure-transmitting member having wedge faces engaging the outer wedge faces of said friction wedge blocks; a spring follower sleeve enclosing said friction wedge blocks, said sleeve having interior wedge faces cooperating with the wedge faces at the inner ends of said friction wedge blocks; and spring resistance means surrounding said sleeve and yieldingly opposing relative movement of said sleeve and friction plates lengthwise of the mechanism.

10. In a friction shock absorbing unit, the combination with a spring follower having a sleevelike inwardly projecting portion provided with a pair of opposed interior wedge faces; of a pair of laterally spaced friction plates extending into said sleevelike portion, said plates and spring follower being movable with respect to each other lengthwise of the mechanism; a central friction block between said plates, said block having friction surfaces on opposite sides engaging the plates; a pair of friction wedge blocks at opposite sides of the plates and having wedging engagement with the wedge faces of the sleeve portion; a spring resistance opposing relative movement of the plates and spring follower; and a pressure-transmitting member engaging the outer ends of the friction wedge blocks, said pressure-transmitting member actuating the central friction block during compression of the mechanism to move said block and friction plates with respect to each other.

11. In a friction shock absorbing mechanism, the combination with a spring follower comprising a sleevelike member having an exterior abutment flange at the outer end thereof, said sleeve member also having interior wedge faces at the inner ends; a pair of laterally spaced friction plates, said plates having lateral flanges at one set of ends; a second spring follower having an opening in which said flanges of the plates are accommodated; a spring resistance surrounding said sleeve member, said spring resistance having one end bearing on the flange of said sleeve and the other end bearing on the second spring follower and on the flanges of said plates; a pair of friction wedge blocks having wedging engagement with the wedge faces of said sleeve member and frictional engagement with said plates; a central friction block between said plates; and a pressure-transmitting member for actuating said central friction block, said pressure-transmitting member engaging the outer ends of said friction wedge blocks.

In witness that I claim the foregoing I have hereunto subscribed my name this sixth day of October, 1931.

STACY B. HASELTINE.